Patented Oct. 31, 1939

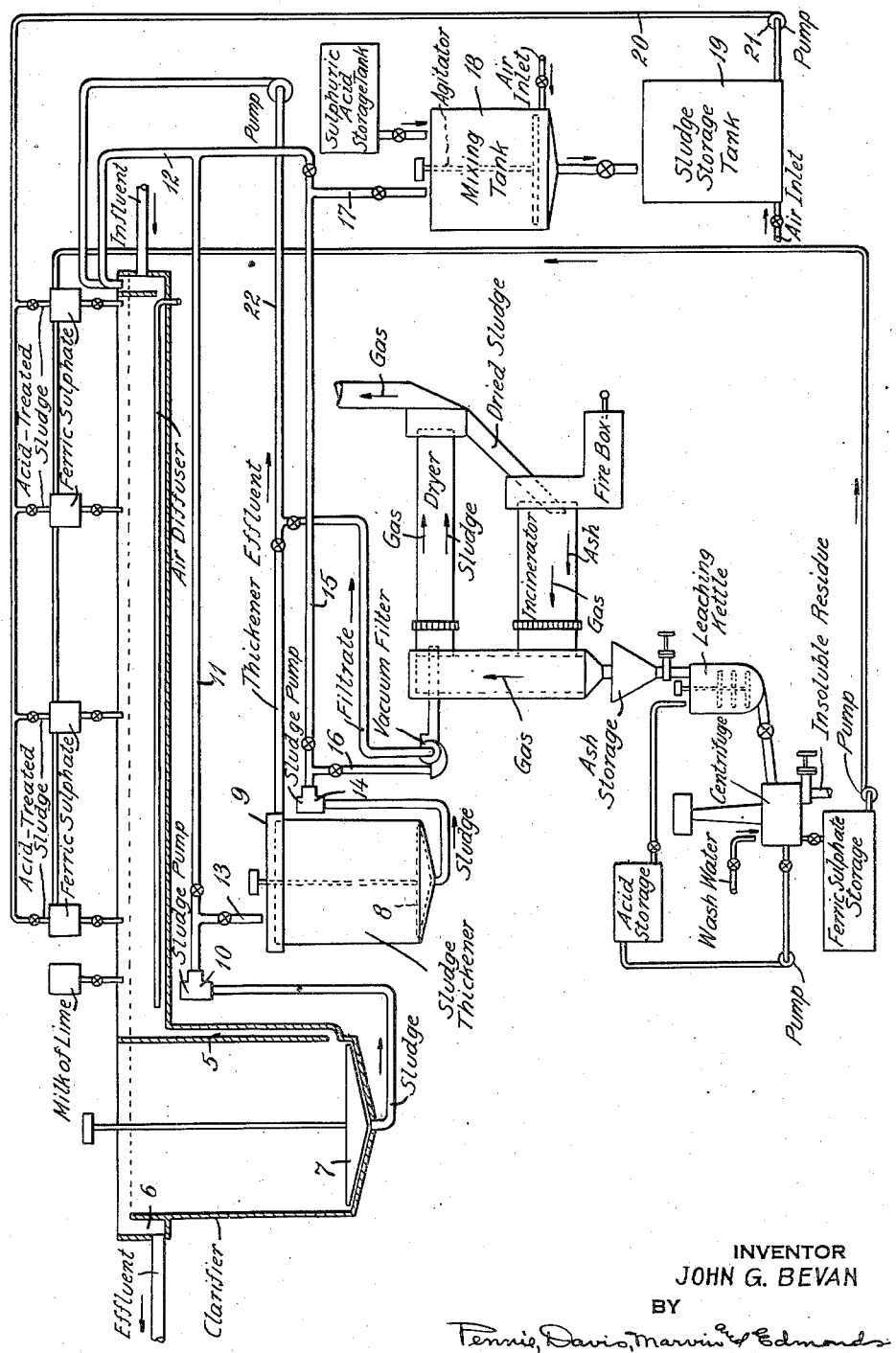

2,177,857

UNITED STATES PATENT OFFICE 2,177,857

TREATING SEWAGE

John G. Bevan, New York, N. Y., assignor to Guggenheim Brothers, New York, N. Y., a copartnership Application December 28, 1934, Serial No. 759,451

2 Claims. (Cl. 210—2)

This invention relates to sewage treatment and has for an object the provision of an improved process for treating sewage and similar waste liquors. More particularly, the invention contemplates the provision of an improved process for removing putrescible matter from sewage and similar waste liquors. The invention further contemplates the provision of a process for treating sewage involving the use of sludge obtained during the course of the process in conjunction with an iron compound or a compound of a trivalent metal for coagulation of suspended matter contained in the sewage. The process of the invention may also include the use of an alkaline agent such as lime when necessary, for adjusting the pH value of the sewage in order to provide for improved settling and improved filtration. The invention can be employed with particular advantage in the first stage of the sewage treating process described in the United States patent to Gleason and Loonam, No. 1,886,267 of November 1, 1932.

In ordinary raw sewages and similar waste liquors, putrescible matter, consisting of carbon, hydrogen, sulphur, etc. in various combinations, is present in two forms, namely; (1) insoluble (suspended matter), (2) soluble. In any sewage treating operation, it is customary to remove the coarser matter by screening. After screening, the concentration of the insoluble putrescible matter remaining in the sewage is relatively low, for example, an average municipal sewage contains around 150 to 200 parts per million of dispersed or finely divided solid matter largely in colloidal suspension. This finely divided putrescible matter includes simple and complex compounds resulting from the breaking down of proteins.

The present invention contemplates certain improvements in the removal of putrescible matter from sewage coagulation, flocculation or entrainment in a settleable sludge. I have discovered that the removal of putrescible matter from sewage is promoted by aerating the sewage in the presence of an added metal compound such, for example, as a compound of iron or aluminum and a quantity of sludge produced or recovered during the course of the process. I prefer to employ one or more soluble compounds of iron or aluminum for addition to the sewage being aerated. I may employ, for example, ferrous sulphate, ferric sulphate, ferric chloride, aluminum chloride, aluminum sulphate or manganese sulphate, or any desired mixtures of these compounds. In employing metal compounds, I may add them to the sewage as solids or in solution. When two or more compounds are employed any or all may be added as solids and any or all may be added in solution. Thus, for example, I may first add a dry soluble salt of aluminum or a solution of an aluminum compound to the sewage and later add a dry soluble salt of iron or a solution of an iron compound. I prefer to add iron compounds in solution, as solid particles of such compounds become coated with sewage solids readily and solution and dispersion are hindered or prevented. Aluminum compounds may be employed advantageously either in solid form or in solution form. Particles of aluminum compounds do not acquire coatings of sewage solids when added to sewage. I have also discovered that coagulation of suspended matter contained in sewage may be promoted by adding to the sewage a sludge produced in a process involving the use of a metal compound as a coagulating agent, after treatment of the sludge with an acid capable of reacting with the metal of the coagulating compound to produce a soluble compound of the metal.

The acid-treated sludge may be employed in any suitable manner. Thus, for example, a portion of the sewage to be treated may be subjected to the action of the metal compound and another portion may be subjected to the action of acid-treated sludge from such a process, or the acid-treated sludge may be employed in conjunction with the metal compound in the treatment of a single batch or flow of sewage. When the acid-treated sludge is employed in conjunction with the metal compound in the treatment of a single batch or flow of sewage, the acid-treated sludge and the metal compound may be employed at the same time or alternately. Thus, for example, the sewage may be treated for a suitable period of time with the metal compound. During this period sludge may be withdrawn continuously and treated with acid. When a suitable amount of acid-treated sludge has accumulated, treatment with the metal compound may be discontinued and treatment with the acid-treated sludge commenced and continued as long as an adequate supply is available. If the acid-treated sludge and the metal compound are employed at the same time, a portion of the sludge recovered during the process may be withdrawn and subjected to the action of acid continuously to maintain an adequate supply of acid-treated sludge.

The sludge may be treated with commercial or relatively pure acid or a solution of a metal compound containing excess acid, for example, a solution containing iron sulphate or iron sulphate and aluminum sulphate together with free sulphuric acid, may be employed for treating the sludge. In this manner a complete coagulating agent containing new or original metal compound and regenerated metal compound may be produced.

In preparing acid-treated sludge, it is advisable to mix the acid with the sludge under oxidizing conditions, as, for example, by means of air or in the presence of an oxidizing agent, in order to maintain the metal compound in oxidized condition and to prevent re-solution of precipitated organic compounds. It is also advisable to maintain oxidizing conditions within the body of acid-treated sludge from its time of production until its time of use. This may be accomplished by introducing an oxidizing gas such as air or an oxidizing agent such as sodium nitrate into the body of acid-treated sludge.

When the acid-treated sludge and the metal compound are employed for treating a single batch or flow of sewage, they may be added together or separately, and when added separately either may be added first and the separate additions may be spaced at any suitable intervals.

An untreated portion of the recovered sludge (a portion not treated with acid) may be returned to the sewage undergoing treatment or not, as desired.

In a preferred complete process of the invention, sewage is aerated in the presence of a metal compound and untreated sludge and the untreated sludge is added to the sewage at the commencement of the aeration treatment or shortly after the raw sewage enters the aeration vessel or basin. The metal compound may be added to the sewage at any desired stage of the aeration treatment. When ferric sulphate is employed, it is preferably added to the sewage during the course of its aeration within about two to fifteen minutes before completion of the aeration treatment. Aluminum sulphate and aluminum chloride also are preferably added within about two to fifteen minutes before completion of the aeration treatment. Ferrous sulphate is preferably added to the sewage within about ten to thirty minutes before the end of the aeration treatment.

Acid-treated sludge may be added at the same time as the iron or aluminum compound or addition of the iron or aluminum compound may be discontinued while the acid-treated sludge is being added. When the metal compound employed is iron or aluminum, the sludge is preferably treated with sulphuric acid in amount about sufficient to form ferric sulphate with the iron in the sludge or aluminum sulphate with the aluminum in the sludge. Excess acid may be employed, if desired. The time of addition of acid-treated sludge containing iron or aluminum sulphate may correspond substantially with the time of addition of iron or aluminum sulphate. Also the amount of metal compound added to sewage is preferably maintained substantially the same whether added as a new or original compound, as a regenerated compound in acid-treated sludge, or as a mixture of new or original compound and regenerated compound in acid-treated sludge.

The acid employed for treating the sludge need not be an acid of which the metal compound added to the sewage is a salt. For example, a metal chloride may be added to the sewage and the sludge may be treated with sulphuric acid to produce a metal sulphate, or an insoluble compound such as a metal oxide may be added to the sewage and the sludge may be treated with any suitable acid capable of forming a soluble compound of the metal.

Good results may be obtained if the period of aeration following the addition of a compound such as ferric sulphate or aluminum sulphate separately or in acid-treated sludge is just sufficient to permit thorough dissemination of the compound. The period of aeration may be varied considerably. Good results may be obtained if aeration is carried out for a period of about one hour or less, and little or no additional advantage may be gained by continuing aeration for a period of time longer than about one hour.

If the pH of the sewage is 7 or lower near the end of the aeration period and it is desired to increase the pH to a value above 7, an amount of an alkaline agent such as lime sufficient to increase the pH to the desired value may be added prior to the completion of the aeration treatment. Usually, it will not be necessary or desirable to adjust the pH of the sewage by the addition of an alkaline agent, as I have found that highly satisfactory precipitation, settling and clarification can be obtained even when the pH is considerably below 7. If the addition of an alkaline agent is desired or required for any purpose, it is preferably added after the soluble metal compound or acid-treated sludge or both have been added and thoroughly disseminated throughout the sewage. Following the aeration treatment, the sewage is introduced into a clarifier underneath a layer or blanket of settling sludge so that the liquor flows upwardly through the sludge blanket and overflows from the clarifier with a practically negligible amount of suspended matter.

In carrying out the process of the invention in its preferred and complete form, the raw sewage, after appropriate screening is mixed with untreated returned sludge in an aeration vessel and aeration of the mixture is commenced. The aeration vessel employed is preferably of the type which permits a continuous flow of the mixture undergoing treatment from an entrance end to a discharge end, and the rate of flow is preferably controlled to provide a period of about one hour between the time of entry and the time of discharge of the sewage. Aeration of the sewage is preferably continued throughout its entire period of detention in the aeration vessel.

As the mixture undergoing treatment is flowing through the aeration vessel, a soluble iron compound, preferably in the form of a ferric sulphate solution of 50 grams per liter concentration and a quantity of acid-treated sludge are added to the mixture at a point corresponding to an interval of about 2 to 15 minutes before the time of discharge of the mixture from the vessel. Prompt diffusion of the solution and the acid-treated sewage throughout the mixture is produced by the agitation resulting from aeration. The oxygen in the air keeps the iron in the ferric condition. When a ferrous salt such as ferrous sulphate is employed, the oxygen of the air converts the iron to the ferric condition.

The incoming raw sewage ordinarily has a pH of around 7 to 7.5. In the coagulating treatment, the trivalent metal ions are precipitated, probably in the form of ferric hydroxide as well as in the form of simple and complex organic ferric compounds. The sulphate ions of the added ferric sulphate and any excess acid in the acid-treated sewage tend to lower the pH of the sewage to a value below 7, but this tendency is largely counteracted by the effects of the aeration and the returned sludge, and the sewage at the conclusion of the ferric sulphate treatment may have a pH equivalent to that of the incoming raw sewage. Substantially all the iron added as ferric sulphate, either as a solution of the salt or in the acid-treated sludge, is precipitated, and it appears that this precipitated iron together with the iron returned with the untreated sludge forms a blanket of ferric hydroxide which acts as a collector of suspended matter. The returned untreated and acid-treated sludge and the aeration treatment also aid in effecting precipitation of the suspended matter. Also, aeration of the sewage causes oxidation of a considerable amount of the dissolved putrescible matter.

The total amount of iron added to the sewage (as an iron salt or solution and in the acid-treated sludge) depends to some extent at least, upon the amount of putrescible matter in the sewage. In the treatment of the average municipal sewages, a total of 5 to 25 parts per million of added iron produces satisfactory coagulation and precipitation of the putrescible matter, and, generally, a total of less than 20 parts per million of iron produces satisfactory results. In the treatment of industrial waste liquors such, for example, as dairy plant and packing plant waste liquors, a total of 20 to 50 parts per million of iron may be required to produce satisfactory coagulation and precipitation. Satisfactory aeration is obtained with from 0.01 to 0.1 cubic foot of air per gallon of sewage treated. It appears that the oxygen of the air employed for aeration functions chiefly to oxidize putrescible matter and is not absorbed by the sludge. This is indicated by rapid elimination of dissolved putrescible matter and the presence of dissolved oxygen in the clarifier overflow.

If adjustment of the pH is desirable following the treatment with ferric sulphate, the sewage may be treated in the presence of an alkaline agent, such as lime, in amount sufficient to give a pH of the desired value. Adjustment of the pH to a value above 7 may sometimes improve settling and filtration. Lime is preferable to other alkaline agents for this operation because it gives a denser floc and one which settles very rapidly, and because it is inexpensive. Lime is preferably added to the sewage as milk of lime in 50 grams per liter concentration. Where dissolved putrescible matter is to be subsequently removed from the sewage liquor by a base exchange (zeolite) treatment, it is preferable to carefully regulate the amount of lime added to the sewage to give a pH of about 7.2 to 7.6.

Following the treatment with lime, the sewage passes to a clarifier, into which it is introduced near the bottom, passing upward through a blanket of settling sludge. Clarified liquor overflows and settled sludge is removed from the bottom of the clarifier, preferably being raked or otherwise mechanically worked along the bottom of the clarifier toward the sludge discharge outlet. The supernatant liquor is substantially free from suspended matter and may advantageously be subjected to a base exchange treatment as described in the aforementioned patent to Gleason and Loonam.

The sludge from the bottom of the clarifier may be conducted in part to a thickener and in part to the aeration vessel. Clarified liquor overflows and settled sludge is removed from the bottom of the thickener. The clarifier and thickener effluents may be combined for appropriate disposal or for subsequent treatment, but the thickener effluent is preferably introduced into the aeration vessel at the entrance end for retreatment. The sludge from the thickener, containing about 3% to 10% solids, may be conducted in part to the aeration vessel, in part to an acid-treatment vessel or mixer and in part to a suction filter where its moisture content is reduced. The filter effluent or filtrate is preferably returned to the aeration vessel for re-treatment. All of the untreated sludge returned to the aeration vessel may be obtained from the clarifier, all may be obtained from the thickener, or a portion may be obtained from the thickener and a portion from the clarifier. About 20% to 75%, more or less, of the sludge is returned in untreated farm to the aeration vessel. The amount of untreated sludge returned may vary considerably. Ordinarily, sludge return may be controlled advantageously to establish in the sewage-sludge mixture undergoing treatment in the aeration vessel an amount of suspended matter equal to about two to eight times the amount of suspended matter in the incoming raw sewage.

It is my preferred practice to completely destroy the organic matter in the filter cake by incineration. A rotary kiln incinerator consisting of two sections, namely, a drying section and a burning section is admirably adapted for the purpose. In both the dryer and incinerator sections of the unit, the air travels concurrently with the solids and gases. The dryer section is operated at a temperature which does not cause decomposition or carbonization of the sludge, and the incinerator section is operated at a temperature of about 650–700° C. This incinerating temperature is sufficiently high to destroy the putrescible matter. The incinerating temperature is preferably kept below 700° C. so that sintering of the residue is avoided. A substantial amount of the heat required for incinerating is obtained by the burning of the sludge. In fact, the calorific value of the sludge is such that in a large scale operation no extraneous fuel is required for incineration.

The incinerated residue is preferably treated with sulphuric acid for the regeneration of the ferric sulphate which is again used in the process.

The single figure of the accompanying drawing is a diagrammatic flowsheet of a system adapted for carrying out the process of the invention.

The raw sewage is first passed through a coarse screen and then through a fine screen (not shown in the drawing) to remove coarse and heavy solid matter. The screened sewage is treated according to the process of the invention.

In the apparatus illustrated in the drawing, aeration of the sewage is carried out in a long tank or basin one end portion of which receives the incoming sewage and the other end portion of which discharges into a clarifier. Untreated returned sludge is added to the raw sewage as it enters the aeration basin and thorough mixing of the sludge and sewage is accomplished by air agitation. In this apparatus, the rate of flow of the sewage through the aeration basin is such as to give a detention period of about one hour. Ferric sulphate solution and acid-treated sludge are preferably added to the sewage in the aeration basin at a point corresponding to an interval of about 2 to 15 minutes before the time of discharge of the sewage into the clarifier, but provision is made for the addition of the ferric sulphate and acid-treated sludge at a number of points between the entrance end and the discharge end of the basin. The ferric sulphate and acid-treated sludge may be added to the sewage in the aeration vessel at one or more points during the course of flow of the sewage through the aeration vessel. If the addition of an alkaline agent is required or desired for adjustment of the pH of the sewage, milk of lime is added between the point or points of addition of the ferric sulphate and acid-treated sludge and the discharge end of the aeration vessel and spaced sufficiently from the point or points of addition of the ferric sulphate and acid-treated sludge to permit thorough dissemination of the ferric sulphate and acid-treated sludge in the sewage before the lime is added. A common air diffuser extends throughout the length of the aeration vessel and provides a source of air for aeration and agitation. The air diffuser may be of any suitable construction.

The clarifier illustrated in the drawing comprises a tank having a peripheral charging well 5 (extending approximately around one-third of the circumference of the tank) and discharging into the bottom of the tank. Clarified liquor overflows in a launder 6 opposite the charging well and extending approximately around one-third of the upper circumference of the tank. A raking mechanism 7 moves sludge settling on the bottom of the tank towards the centrally positioned sludge discharge outlet. It is to be understood that other forms and types of clarifier may be used in practicing the invention. I have found that the introduction of the sewage near the bottom of a settling chamber beneath a settling mass of sludge therein materially aids in the production of a supernatant liquor substantially free from suspended matter.

Sludge from the clarifier is pumped by means of a pump 10 to a thickener having a sludge raking mechanism 8 and an overflow launder 9, or in part to the thickener and in part to the entrance end of the aeration vessel. The sludge pump 10 communicates with a conduit 11 which leads to a sludge return conduit 12. A by-pass conduit 13 is provided for conducting sludge from the pump 10 and conduit 11 to the thickener. Suitable valves are provided in the conduits 11 and 13 to control and distribute the flow of sludge therethrough. The clarifier effluent may be subjected to further treatment, as, for example, by means of zeolite filters as described in the aforementioned patent to Gleason and Loonam. The thickener effluent is preferably conducted through a conduit 22, having a suitable pump included therein and communicating with the entrance end portion of the aeration vessel, to the aeration vessel for re-treatment.

A portion of the sludge from the thickener may be conducted by means of a pump 14 and conduit 15 to the sludge return conduit 12 leading to the entrance end of the aeration vessel. A by-pass conduit 17 is provided for conducting sludge from the thickener to the acid-mixing tank 18. The mixing tank is provided with an agitator and an inlet for introducing air under pressure. The remainder of the sludge from the thickener is conducted through the conduit 16 to a suction filter. Suitable valves are provided in the conduits 15, 16 and 17 to control and distribute the flow of sludge therethrough. The filter-cake is conveyed to the dryer and incinerator. The filter effluent or filtrate is conducted to the entrance end portion of the aeration through the conduit 22 and a conduit 23 which communicates with the filter and the conduit 22. Suitable valves are provided in the conduits 22 and 23 to control the flow of liquids therethrough.

Sludge is conducted to the acid mixing tank 18 through the conduit 17. Sulphuric acid is added to and mixed with the sludge in the mixing tank in an amount sufficient, and preferably not substantially in excess of that required, to form ferric sulphate with all the iron contained in the sludge. Preferably, the amount of sulphuric acid added to the sludge is just sufficient to establish in the sludge iron and the sulphate ($SO_4$) radical in the proportion in which they would be present in an amount of ferric sulphate containing an amount of iron equal to that contained in the sludge. The acid-treated sludge is stored in a sludge storage tank 19 for subsequent use. A conduit 20 having a pump 21 included therein is provided for conducting acid-treated sludge from the storage tank to the reagent supply system. The sludge storage tank is provided with an air inlet to permit the introduction of air for maintaining the acid-treated sludge in an oxidized condition.

The untreated sludge returned to the aeration vessel (20% to 75%, more or less) may be returned entirely either from the clarifier or from the thickener, or a portion may be returned from the clarifier and a portion from the thickener.

Both the dryer and incinerator are rotatably mounted cylinders in which the solid material and gases (for drying and incinerating) travel concurrently. Thus, the exhaust gas from the incinerator moves through the dryer concurrently with the sludge, and the dried sludge enters the incinerator along with hot gases from an oil burner or other heating means. An adequate amount of oxygen or other combustion supporting gas enters the incinerator (along with the hot gases of combustion of the extraneous fuel) to burn the organic and other combustible matter in the dried sludge. The incinerated residue or ash is discharged from the incinerator to a storage container from whence it is appropriately fed to a jacketed leaching kettle. In the kettle, the incinerated residue is treated with sulphuric acid, being appropriately agitated and also heated if necessary, for the regeneration of ferric sulphate. The contents of the kettle is delivered to a centrifuge for the removal of excess acid. The centrifuged cake is leached with water to dissolve the ferric sulphate present and the insoluble residue is filtered off and discarded. The regenerated ferric sulphate solution is pumped back for reuse in the coagulation of fresh incoming sewage.

It will of course be understood that the apparatus illustrated in the drawing is merely illustrative and is not intended to be restrictive of the invention in any respect.

In the following table are given the daily results obtained in tests conducted for the purpose of illustrating the results obtainable by means of the process of the present invention. In carrying out the tests of the process of the invention, about 75% of the sludge obtained in the clarifier (containing about 4% solids) was returned directly from the clarifier to the aeration vessel, aeration was continued for one hour periods and ferric sulphate and acid-treated sludge were added to the aeration vessel about five minutes before the end of the aeration period. The sewage was treated alternately with an amount of ferric sulphate equivalent to 20 parts per million of iron and one-quarter of the sludge treated with 68 p. p. m. 60° Bé. sulphuric acid, three-quarters of the sludge being returned to the aeration vessel continuously. The acid-treated sludge was added at such a rate as to introduce iron in amount equivalent to about 20 parts per million. The biochemical oxygen demand (B. O. D.) and suspended matter are given in parts per million. The purified effluent was the supernatant liquor from the clarifier. The standard 5 day test, using seeded diluting water, was employed in determining the biochemical oxygen demand.

| Date | Raw | | Effluent | | Percent combined reduction |
|---|---|---|---|---|---|
| | B. O. D. | Susp. | B. O. D. | Susp. | |
| Nov. 19 | 135 | 172 | 16 | 13 | 91 |
| 20 | 138 | 180 | 13 | 13 | 92 |
| 21 | 163 | 320 | 15 | 9 | 94 |
| 22 | 105 | 112 | 6 | 16 | 90 |
| 23 | 120 | 188 | 10 | 8 | 94 |
| 26 | 183 | 180 | 30 | 20 | 87 |
| 27 | 143 | 176 | 15 | 11 | 92 |
| 28 | 148 | 240 | 16 | 12 | 92 |
| 30 | 98 | 172 | 16 | 9 | 90 |
| Dec. 3 | 158 | 180 | 18 | 18 | 90 |
| 4 | 148 | 160 | 18 | 8 | 92 |
| 5 | 133 | 148 | 22 | 18 | 86 |
| 6 | 173 | 224 | 8 | 10 | 95 |
| 7 | 143 | 128 | 17 | 12 | 89 |
| Total | 1988 | 2580 | 220 | 117 | |
| Average | 142 | 184 | 16 | 13 | 91 |

While I have described my preferred process as including the use of ferric sulphate in conjunction with acid-treated sludge, it will be understood that other metal compounds may be used advantageously in accordance with my invention. Thus, for example, ferrous sulphate, when added at an appropriate time may cause a better B. O. D. reduction than can be accomplished in using ferric sulphate. For this reason, and because ferrous sulphate is less expensive than ferric sulphate, the use of ferrous sulphate may be preferable. Also, results similar to those obtained in using ferric sulphate may be obtained by employing aluminum sulphate. Mixtures of various compounds may be employed advantageously, and desirable results may be obtained by adding two or more compounds separately. For example, I have obtained extremely good results by adding small amounts of aluminum sulphate within a minute or two after the final addition of ferric sulphate. The amounts of aluminum sulphate employed were equal to about ten percent of the amounts of ferric sulphate employed. I have also obtained very desirable results by adding a solution made by dissolving both aluminum sulphate and ferric sulphate, about 1 part of aluminum to 10 parts of iron.

The process of my invention is admirably adapted for the treatment of industrial waste liquors as well as ordinary municipal or domestic sewages. It is characteristic of the process of the invention that an extremely rapidly settling sludge is produced and high elimination of putrescible matter is accomplished. Sludge produced in carrying out the method of the invention settles several times as fast as sludge produced in processes in common use. It is not unusual to obtain upon standing for five minutes a clear supernatant liquid which may be decanted, and I have accomplished B. O. D. reductions of more than 96% in the normal operation of the process on many occasions.

I claim:

1. The improvement in the treatment of sewage containing putrescible matter which comprises subjecting the sewage to the action of a water-soluble compound of a trivalent metal to coagulate the putrescible matter, separating the coagulated putrescible matter in the form of a sludge from the accompanying liquor, subjecting the sludge, without drying, to the action of an acid capable of regenerating and in amount not substantially in excess of that required to regenerate the soluble metal compound, maintaining oxidizing condition within the body of the acid-treated sludge and utilizing the acid-treated sludge in conjunction with added trivalent metal compound for the treatment of additional sewage by incorporating said acid-treated sludge in the sewage to coagulate putrescible matter therein.

2. In a process for treating sewage to effect the removal of putrescible matter involving aeration of the sewage in the presence of returned sludge and a water-soluble compound of a metal of the group consisting of iron, aluminum and manganese to effect coagulation of the putrescible matter, and recovery of a sludge containing the coagulated putrescible matter and the metal of the soluble metal compound employed to effect coagulation, the improvement which comprises returning a portion of the recovered sludge directly to the sewage undergoing treatment, treating another portion of the recovered sludge, without drying, with an acid capable of forming and in amount not substantially in excess of that required to form a water-soluble compound by reaction with said metal contained in the sludge, maintaining oxidizing condition in the body of the acid-treated sludge from the time of its production until the time of its use, and utilizing the acid-treated sludge in conjunction with the soluble metal compound to effect coagulation of the putrescible matter by incorporating said acid-treated sludge in the sewage undergoing treatment.

JOHN G. BEVAN.